United States Patent
Ji

(10) Patent No.: US 11,678,048 B2
(45) Date of Patent: Jun. 13, 2023

(54) IMAGE DISPLAY APPARATUS, IMAGE DISPLAY METHOD, AND ELECTRONIC DEVICE

(71) Applicant: BEIJING XIAOMI MOBILE SOFTWARE CO., LTD., Beijing (CN)

(72) Inventor: Gaoping Ji, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 176 days.

(21) Appl. No.: 17/210,249

(22) Filed: Mar. 23, 2021

(65) Prior Publication Data

US 2022/0038638 A1 Feb. 3, 2022

(30) Foreign Application Priority Data

Jul. 29, 2020 (CN) .......................... 202010744405.1

(51) Int. Cl.
*H04N 23/63* (2023.01)
*H04N 23/80* (2023.01)

(52) U.S. Cl.
CPC ......... *H04N 23/632* (2023.01); *H04N 23/633* (2023.01); *H04N 23/80* (2023.01)

(58) Field of Classification Search
CPC ......... H04N 5/232935; H04N 5/23229; H04N 5/232939; H04N 5/2258; H04N 5/23227; H04N 5/247; H04N 5/23293; H04N 5/232; H04N 23/632; H04N 23/633; H04N 23/80; H04N 23/665; H04N 23/90; H04N 23/45; H04N 23/60; H04N 23/63
See application file for complete search history.

(56) References Cited

U.S. PATENT DOCUMENTS

| | | | |
|---|---|---|---|
| 10,602,119 B1 | 3/2020 | Bakhtazad et al. | |
| 2004/0179816 A1* | 9/2004 | Takehana | G11B 27/032 386/281 |
| 2007/0177015 A1* | 8/2007 | Arakawa | H04N 7/181 348/E7.086 |
| 2019/0373173 A1 | 5/2019 | Wang et al. | |

FOREIGN PATENT DOCUMENTS

CN 111416944 A 7/2020

OTHER PUBLICATIONS

European Patent Application No. 21166335.6 extended search and opinion dated Sep. 20, 2021, 9 pages.
Chinese Patent Application No. 202010744405.1, Office Action dated Dec. 20, 2022, 4 pages.
Chinese Patent Application No. 202010744405.1, English translation of Office Action dated Dec. 20, 2022, 8 pages.

\* cited by examiner

*Primary Examiner* — Timothy J Henn
(74) *Attorney, Agent, or Firm* — Cozen O'Connor

(57) ABSTRACT

An image display apparatus, an image display method, and an electronic device. The apparatus includes: a first camera, configured to output a frame of first image signal during each of frame periods, each of the frame periods including a first duration and a second duration; a second camera, configured to output a frame of second image signal during the second duration; an image signal processor; and a switch module, coupled to the first camera, the second camera, and the image signal processor, and configured to turn on the first camera and the image signal processor before the first image signal is outputted, and turn on the second camera and the image signal processor before the second image signal is outputted.

13 Claims, 6 Drawing Sheets

IMAGE DISPLAY APPARATUS, IMAGE DISPLAY METHOD, AND ELECTRONIC DEVICE

CROSS-REFERENCE TO RELATED APPLICATION

This application claims priority to Chinese Patent Application No. 202010744405.1, filed on Jul. 29, 2020, the entire contents of which are incorporated herein by reference.

TECHNICAL FIELD

The disclosure generally relates to the field of electronic device technologies, and more particularly, to an image display apparatus, an image display method, and an electronic device.

BACKGROUND

With rapid development of technologies relating to electronic devices, electronic devices equipped with more than one cameras have become popular. For instance, certain mobile phones or tablet computers are equipped with two, three, or even four cameras. When capturing images, the plurality of cameras may complement each other to improve imaging effect and diversity of images, which greatly enhances user experience.

SUMMARY

According to an aspect of embodiments of the disclosure, there is provided an image display apparatus, including: a first camera, configured to output a frame of first image signal during each of frame periods, each of the frame periods including a first duration and a second duration, the first duration for indicating a duration for outputting the first image signal by the first camera, and the second duration for indicating a duration for terminating outputting the first image signal by the first camera; a second camera, configured to output a frame of second image signal during the second duration; an image signal processor; and a switch module, coupled to the first camera, the second camera, and the image signal processor, and configured to turn on the first camera and the image signal processor before the first image signal is outputted, and turn on the second camera and the image signal processor before the second image signal is outputted.

According to another aspect of embodiments of the disclosure, there is provided an image display method for an image display apparatus. The image display apparatus includes a first camera, a second camera, a switch module coupled to the first camera and the second camera, and an image signal processor coupled to the switch module. The method includes: turning on, by the switch module, the first camera and the image signal processor; outputting, by the first camera, a frame of first image signal to the image signal processor during each of frame periods, each of the frame periods including a first duration and a second duration, the first duration for indicating a duration for outputting the first image signal by the first camera, and the second duration for indicating a duration for terminating outputting the first image signal by the first camera; turning on, by the switch module, the second camera and the image signal processor; and outputting, by the second camera, a frame of second image signal to the image signal processor during the second duration.

According to another aspect of embodiments of the disclosure, there is provided an electronic device including any above image display apparatus.

DETAILED DESCRIPTION

Figure 1:
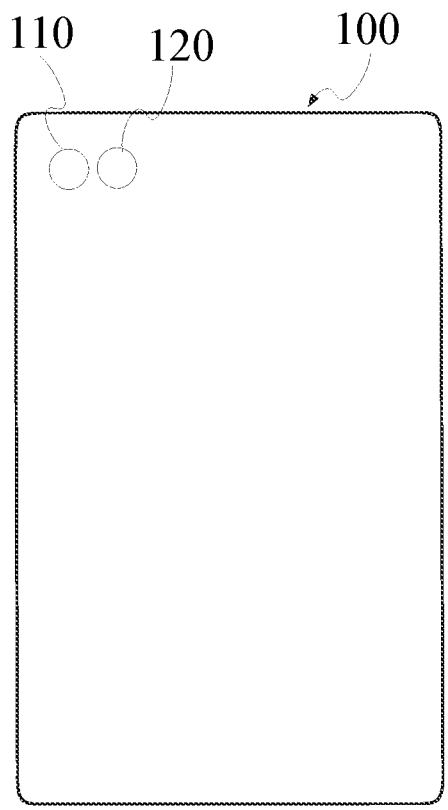
FIG. 1 is a block diagram of an image display apparatus, according to exemplary embodiments of the disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terminology used in the disclosure is for the purpose of describing exemplary examples only and is not intended to limit the disclosure. Unless otherwise defined, the technology terminology or scientific terminology used in the disclosure shall have the ordinary meanings understood by those skilled in the field to which the disclosure belongs. As used in the specification and appended claims of disclosure, the "first", "second" and similar words do not denote any order, quantity or importance, but are only used to distinguish different components. Similarly, "a," "an" and similar words do not denote any quantity limitation but denote that there is at least one. Unless otherwise stated, "including" or "comprising" and other similar words mean that the elements or items before "including" or "comprising" cover the elements or items listed after "including" or "comprising" and their equivalents, and other components or objects are not excluded. Similar words such as "connected" or "coupled" are not limited to physical or mechanical connections, and may include electrical connections, whether direct or indirect.

As used in the description of the disclosure and the appended claims, "a" and "the" in singular forms mean including plural forms, unless clearly indicated in the context otherwise. It should also be understood that, as used herein, the term "and/or" represents and contains any one and all possible combinations of one or more associated listed items.

In some embodiments, the image display apparatus may include a plurality of cameras. Each of the plurality of cameras may be equipped with one ISP (Image Signal Processing) chip. This requires each of the plurality of cameras to be connected to the corresponding ISP chip through wiring, thus requiring a larger number of ISP chips. This, in turn, will incur higher cost and will require a larger wiring space.

In another some embodiments, the image display apparatus may include a plurality of cameras. The plurality of cameras may share one ISP chip. However, when capturing, one camera only may send image signals to the ISP chip, that is, one camera only may work. When using another camera, it needs to switch to the other camera. In this way, the plurality of cameras cannot capture at the same time, which is not conducive to improving the user experience.

In order to solve the above problems, embodiments of the disclosure provide an image display apparatus, an image display method, and an electronic device, which are described in detail below with reference to the accompanying drawings.

Figure 2:
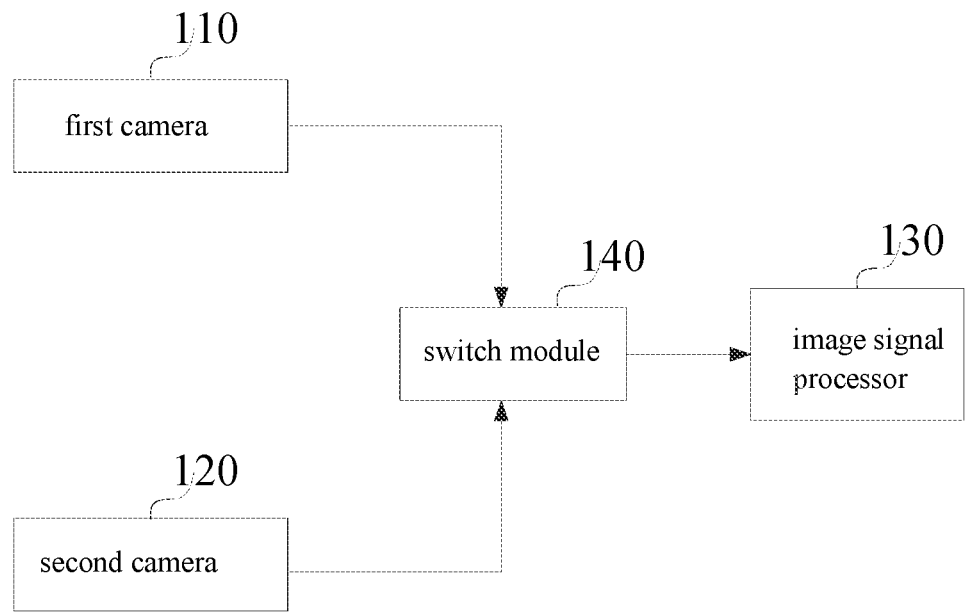
FIG. 2 is a partial circuit block diagram of an image display apparatus, according to exemplary embodiments of the disclosure.

FIG. 1 is a block diagram of an image display apparatus, according to exemplary embodiments of the disclosure. FIG. 2 is a partial circuit block diagram of an image display apparatus, according to exemplary embodiments of the disclosure. With reference to FIG.1 and FIG. 2 together, the image display apparatus 100 may include a first camera 110, a second camera 120, an image signal processor 130, and a switch module 140.

The first camera 110 is configured to output a frame of first image signal during each of frame periods. Each of the frame periods may include a first duration and a second duration. The first duration may be configured for indicating a duration for outputting the first image signal by the first camera 110. The second duration may be configured for indicating a duration for terminating outputting the first image signal by the first camera 110. That is, the first camera 110 may output one frame of first image signal during each frame period, but the duration for outputting the first image signal does not completely occupy the entire corresponding frame period.

The second camera 120 is configured to output a frame of second image signal during the second duration. Exemplarily, a duration for outputting the frame of second image signal by the second camera 120 may be less than the second duration. Exemplarily, a duration for outputting the frame of second image signal by the second camera 120 is equal to the second duration. Exemplarily, physical parameters such as resolution and data type of the first camera 110 and the second camera 120 may be the same, so that the duration for outputting the frame of first image signal by the first camera 110 may be equal to the duration for outputting the frame of second image signal by the second camera 120. In other words, the duration for outputting the frame of second image signal by the second camera 120 may be equal to the first duration. Exemplarily, the duration for outputting the frame of first image signal by the first camera 110 may be not equal to the duration for outputting the frame of second image signal by the second camera 120. The disclosure does not specifically limit the sequence in which the first camera 110 and the second camera 120 output image signals during each frame period.

It should be noted that the first camera 110 may include a first lens and a first image sensor. The first image sensor may include a first chip for controlling operations of the first camera 110. The second camera 120 may include a second lens and a second image sensor. The second image sensor may include a second chip for controlling operations of the second camera 120.

The image signal processor 130 is configured to receive and process the first image signal outputted by the first camera 110 and the second image signal outputted by the second camera 120. Exemplarily, the image signal processor 130 may include an ISP chip.

The switch module 140 may be coupled to the first camera 110, the second camera 120, and the image signal processor 130. The switch module 140 is configured to turn on the first camera 110 and the image signal processor 130 before the first image signal is outputted. Therefore, the first camera 110 may output the first image signal to the image signal processor 130 duration the first duration. The switch module 140 is configured to turn on the second camera 120 and the image signal processor 130 before the second image signal is outputted. Therefore, the second camera 110 may output the second image signal to the image signal processor 130 duration the second duration. It may be understood that, during one frame period, the first camera 110 outputs one frame of first image signal to the image signal processor 130, and the second camera 120 outputs one frame of second image signal to the image signal processor 130, which makes the first camera 110 and the second camera 120 time-division multiplex the image signal processor 130 during each frame period.

With the image display apparatus 100 provided in the embodiments of the disclosure, the first camera 110 and the image signal processor 130 may be turned on through the switch module 140, so that the first camera 110 may output the first image signal to the image signal processor 130 during the first duration of each frame period. The second camera 120 and the image signal processor 130 may be turned on through the switch module 140, so that the second camera 120 may output the second image signal to the image signal processor 130 during the second duration of each frame period. In this way, during each frame period, the first camera 110 and the second camera 120 may both output image signals to the image signal processor 130. Therefore, the first camera 110 and the second camera 120 may share one image signal processor 130 and work at the same time, which is beneficial to improve the user experience.

Figure 3:
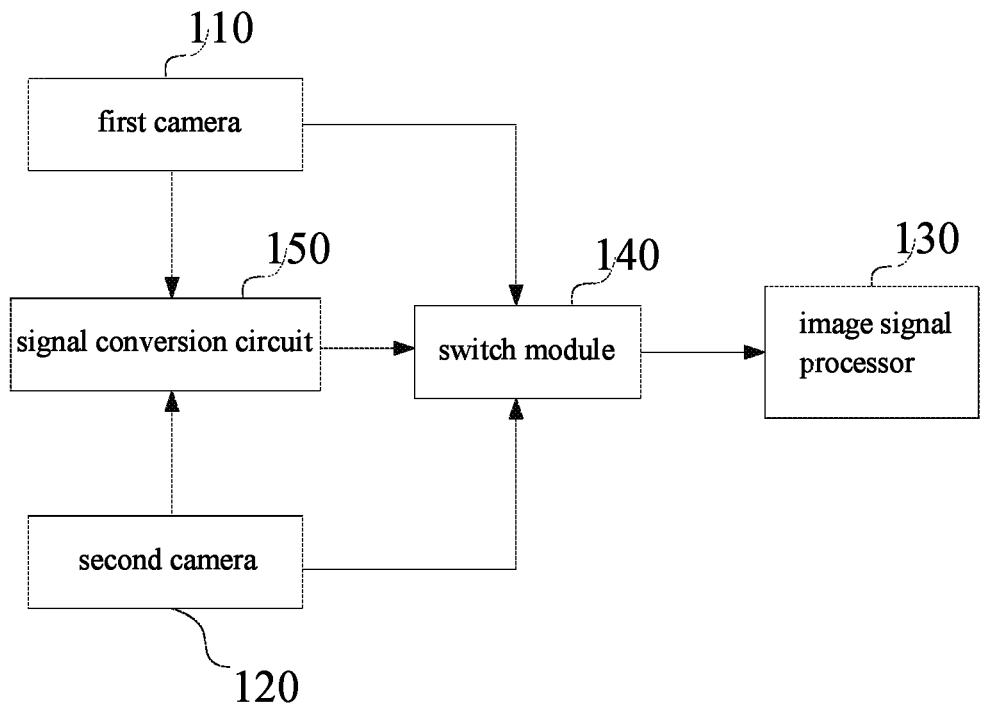
FIG. 3 is a partial circuit block diagram of an image display apparatus, according to exemplary embodiments of the disclosure.

FIG. 3 is a partial circuit block diagram of an image display apparatus, according to exemplary embodiments of the disclosure. In embodiments of the disclosure, the turn-on mode of the switch module 140 may be controlled in various ways. In some embodiments, referring to FIG. 3, the image display apparatus 100 may further include a signal conversion circuit 150. The signal conversion circuit 150 may be coupled to the first camera 110 and the switch module 140. The first camera 110 is further configured to output a first synchronization signal to the signal conversion circuit 150 before outputting the first image signal. The signal conversion circuit 150 is configured to convert the first synchronization signal into a first turn-on signal.

The "first synchronization signal" refers to a hardware synchronization signal, which is also called as a hw sync A signal. The hw sync A signal may be generated by the first camera 110. The first camera 110 may output the hw sync A signal to the signal conversion circuit 150 before a head of the frame of first image signal is outputted. The signal conversion circuit 150 is configured to convert the first synchronization signal into the first turn-on signal suitable for the switch module 140. Exemplarily, the first synchronization signal is an analog signal, the first turn-on signal is a digital signal. The signal conversion circuit 150 converts the first synchronization signal into the digital signal.

In some embodiments, continuing to refer to FIG. 3, the signal conversion circuit 150 is also coupled to the second camera 120. The second camera 120 is further configured to output a second synchronization signal to the signal conversion circuit 150 before outputting the second image signal. The signal conversion circuit 150 is configured to convert the second synchronization signal into a second turn-on signal.

Similarly, the "second synchronization signal" refers to a hardware synchronization signal, which is also called as a hw sync B signal. The hw sync B signal may be generated by the second camera 110. The second camera 110 may output the hw sync B signal to the signal conversion circuit 150 before a head of the frame of second image signal is outputted. Exemplarily, the second synchronization signal is an analog signal, the second turn-on signal is a digital signal. The signal conversion circuit 150 converts the second synchronization signal into the digital signal.

In some embodiments, the switch module 140 is configured to: turn on the first camera 110 and the image signal processor 130 in response to the first turn-on signal; and turn on the second camera 120 and the image signal processor 130 in response to the second turn-on signal.

In other words, when the switch module 140 receives the first turn-on signal, the switch module 140 turns on the first camera 110 and the image signal processor 130, so that the first camera 110 may output the first image signal to the image signal processor 130 during the first duration of each frame period. When the switch module 140 receives the second turn-on signal, the switch module 140 turns on the second camera 120 and the image signal processor 130, so that the second camera 120 may output the second image signal to the image signal processor 130 during the second duration of each frame period.

Exemplarily, the switch module 140 may include at least one power switch tube. The first turn-on signal may be a high-level signal, and the second turn-on signal may be a low-level signal. In this way, the power switch tube is driven to be turned on or off by the high-level signal or the low-level signal, so that the switch module 140 turns on the first camera 110 and the image signal processor 130, or the switch module 140 turns on the second camera 120 and the image signal processor 130.

In some embodiments, the first camera 110 includes a first Mipi (mobile industry processor interface), and the first Mipi is coupled to the switch module 140 through a first Mipi bus; and/or the second camera 120 includes a second Mipi, and the second Mipi is coupled to the switch module 140 through a second Mipi bus; and/or the switch module 110 includes a third Mipi, and the third Mipi is coupled to the image signal processor 130 through a third Mipi bus. The switch module 140 may be a Mipi switch chip, and this Mipi switch chip has a Mipi. In this way, through the cooperation of the first Mipi, the first Mipi bus, the second Mipi, the second Mipi bus, the third Mipi, and third Mipi bus, data may be sent more efficiently and with lower consumption, and may be occupied a smaller space, which facilitates the high integration of the image display apparatus 100.

Figure 4:
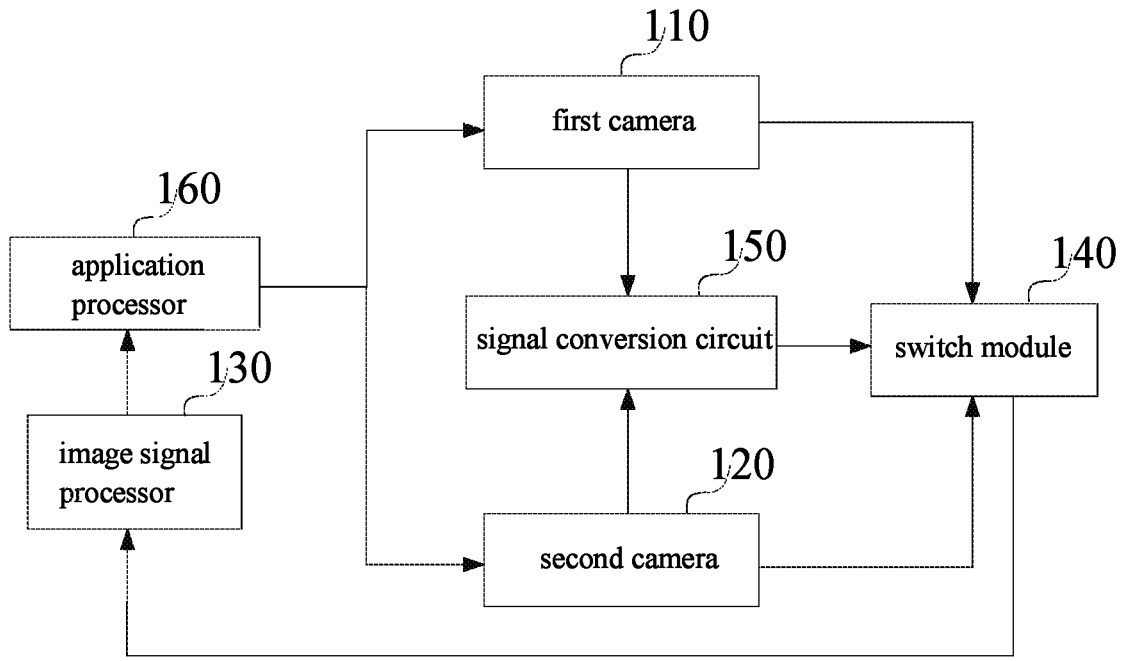
FIG. 4 is a partial circuit block diagram of an image display apparatus, according to exemplary embodiments of the disclosure.

FIG. 4 is a partial circuit block diagram of an image display apparatus, according to exemplary embodiments of the disclosure. In some embodiments, referring to FIG. 4, the image display apparatus 100 may further include an application processor (AP) 160. The application processor 160 may be coupled to the first camera 110, the second camera 120, and the image signal processor 130, and configured to control the first camera 110 and the second camera 120 to work. The first camera 110 responds to the first work signal sent by the application processor 160, and the first camera 110 starts to work. The work of the first camera 110 includes outputting the first synchronization signal and the first image signal. The second camera 120 responds to the second work signal sent by the application processor 160, and the second camera 120 starts to work. The work of the second camera 120 includes outputting the second synchronization signal and the second image signal. Exemplarily, the application processor 160 is coupled to the first camera 110 and the second camera 120 through an IIC (Inter-Integrated Circuit) bus. The application processor 160 is further configured to receive the output signal of the image signal processor 130 and display it on the display screen.

In addition, the application processor 160 may also directly output the first synchronization signal and the second synchronization signal to the signal conversion circuit 150. The signal conversion circuit 150 converts the first synchronization signal into the first turn-on signal and converts the second synchronization signal into the second turn-on signal. The switch module 140 turns on the first camera 110 and the image signal processor 130 based on the first turn-on signal. The switch module 140 turns on the second camera 120 and the image signal processor 130 based on the second turn-on signal.

Figure 5:
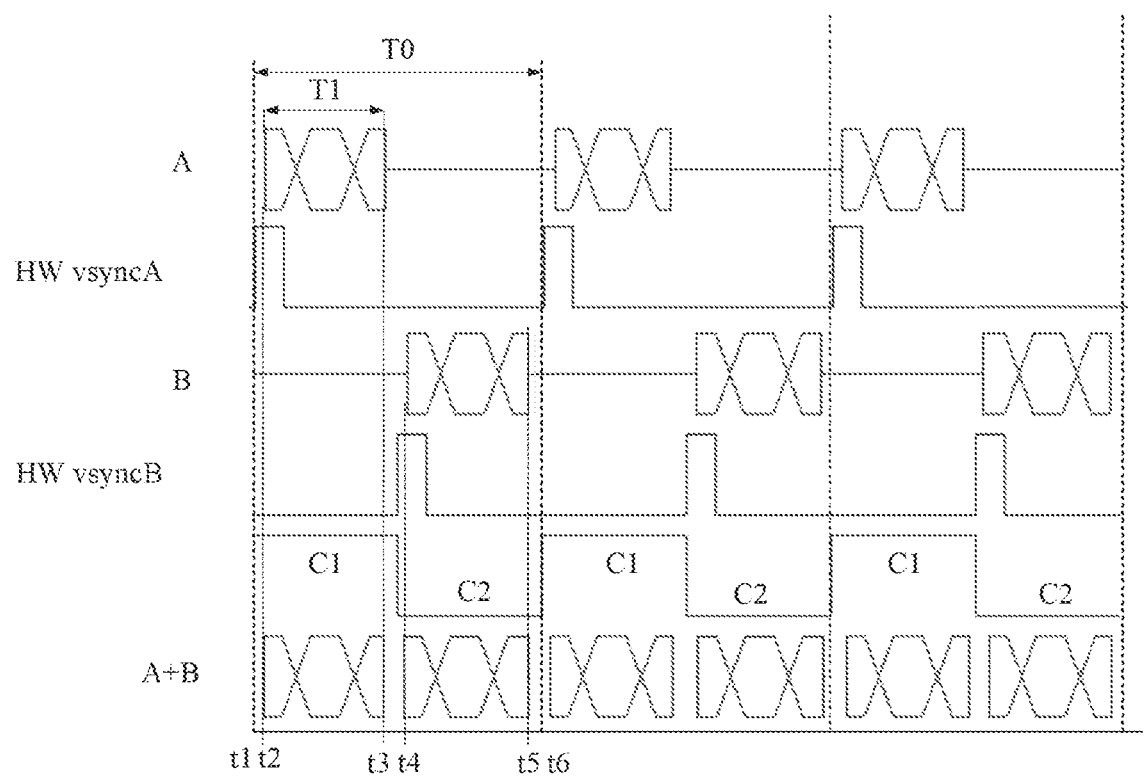
FIG. 5 is a working sequence diagram of an image display apparatus, according to exemplary embodiments of the disclosure.

FIG. 5 is a working sequence diagram of an image display apparatus, according to exemplary embodiments of the disclosure. To more clearly understand the image display apparatus 100 provided in embodiments of the disclosure, the working principle of the image display apparatus 100 may be described below in conjunction with FIG. 5.

The image display apparatus 100 may include the first camera 110 and the second camera 120. The frame period where one frame of first image signal is outputted by the first camera 100 may be 30 frames per second, that is, the first camera 110 outputs one frame of first image signal A every 1/30 second. However, the duration (the first duration) for outputting one frame of first image signal A by the first camera 100 may be 1/60 second, and there is a second duration of another 1/60 second during each frame period to terminate outputting the first image signal A. Therefore, the second duration may be employed to enable the second camera 120 to output one frame of second image signal B.

During each frame period, before the first camera 110 outputs the frame of first image signal, the first camera 110 outputs the first synchronization signal HW vsync A to the signal conversion circuit 150 at time t1. The signal conversion circuit 150 converts the first synchronization signal HW vsync A into a first turn-on signal C1. The switch module 140 turns on the first camera 110 and the image signal processor 130 in response to the first turn-on signal C1. The first camera 110 may output the frame of first image signal A to the image signal processor 130 from time t2 to time t3 (the first duration T1).

When the first camera 110 terminates outputting the first image signal A to the image signal processor 130 during the second duration, and before the second camera 120 outputs the second image signal B, the second camera 120 sends the second synchronization signal HW vsync B to the signal conversion circuit 150 before time t4. The signal conversion circuit 150 converts the second synchronization signal HW vsync B into the second turn-on signal C2. The switch module 140 turns on the second camera 120 and the image signal processor 130 in response to the second turn-on signal C2. The second camera 120 outputs the second image signal B to the image signal processor 130 from time t4 to t5 during the second duration. At time t6, the above actions may be repeated.

In this way, during each frame period T0, the first camera 110 outputs the first image signal A to the image signal processor 130, and the second camera 120 outputs the second image signal B to the image signal processor 130. This allows the first camera 110 and the second camera 120 to time-division multiplex the image signal processor 130 during each frame period.

If during each frame period, the first camera 110 outputs one frame of first image signal to the image signal processor 130, and then the second camera 120 outputs one frame of second image signal to the image signal processor 130. In this way, the image signal processor 130 receives the alternate first image signal and second image signal. The image signal processor 130 receives the first image signal at the $(2N+1)^{th}$ time, and receives the second image signal at the $2N^{th}$ time, where N is an integer greater than 0.

In some embodiments, the image display apparatus provided in the embodiments of the disclosure may include two signal processors 130, two first cameras 110, and two second cameras 120. Each image signal processors 130 is matched with one first camera 110 and one second camera 120.

Figure 6:
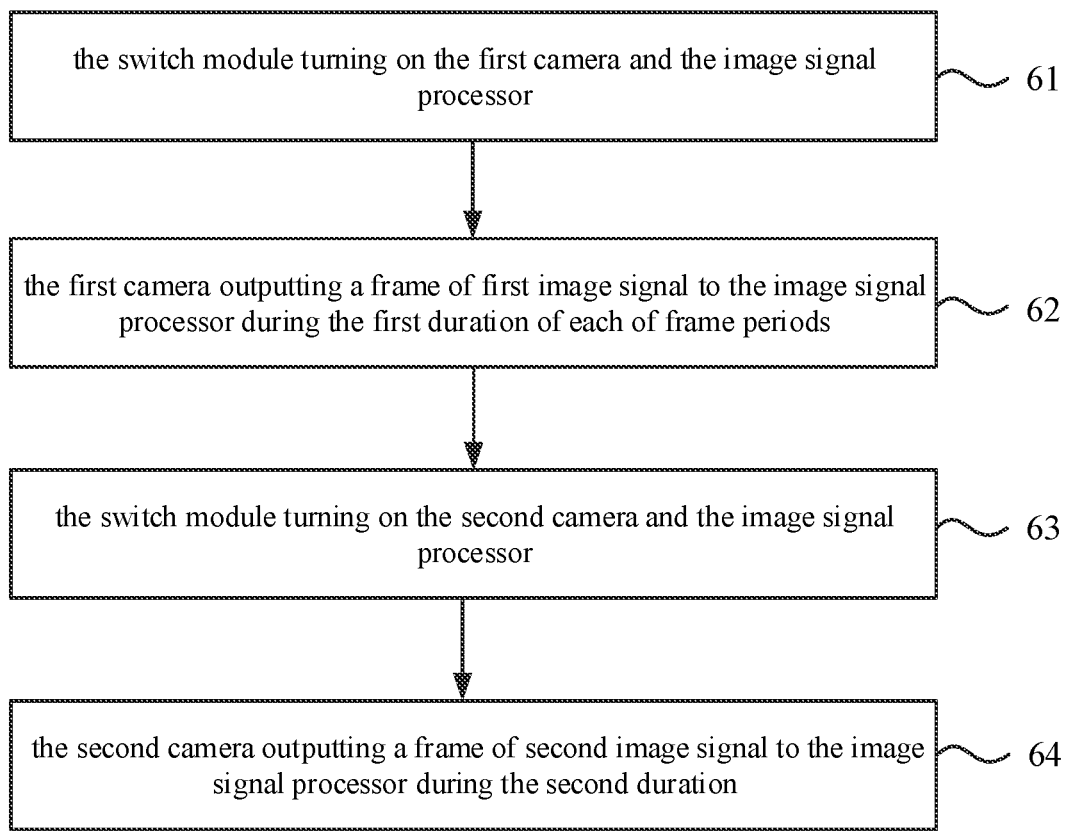
FIG. 6 is a flow chart of an image display method, according to exemplary embodiments of the disclosure.

FIG. 6 is a flow chart of an image display method, according to exemplary embodiments of the disclosure. The image display method is applicable to the image display apparatus. The image display apparatus includes a first camera, a second camera, a switch module coupled to the first camera and the second camera, and an image signal processor coupled to the switch module. As illustrated in FIG. 6, the method may include the following.

At block 61, the switch module turns on the first camera and the image signal processor.

At block 62, the first camera outputs a frame of first image signal to the image signal processor during each of frame periods. Each of the frame periods may include a first duration and a second duration. The first duration is configured for indicating a duration for outputting the first image signal by the first camera. The second duration is configured for indicating a duration for terminating outputting the first image signal by the first camera.

At block 63, the switch module turns on the second camera and the image signal processor.

At block 64, the second camera outputs a frame of second image signal to the image signal processor during the second duration.

The disclosure does not limit the sequence of the action at block 61 and the action at block 63. For related explanations of the actions at blocks 61 to 64, reference may be made to the description of the above-mentioned image display apparatus, which is not be repeated herein.

With the image display method provided in embodiments of the disclosure, the first camera and the image signal processor may be turned on through the switch module, so that the first camera may output the first image signal to the image signal processor during the first duration of each frame period. The second camera and the image signal processor may be turned on through the switch module, so that the second camera may output the second image signal to the image signal processor during the second duration of each frame period. In this way, during each frame period, the first camera and the second camera may both output image signals to the image signal processor. Therefore, the first camera and the second camera may share one image signal processor and work at the same time, which is beneficial to improve the user experience.

Figure 7:
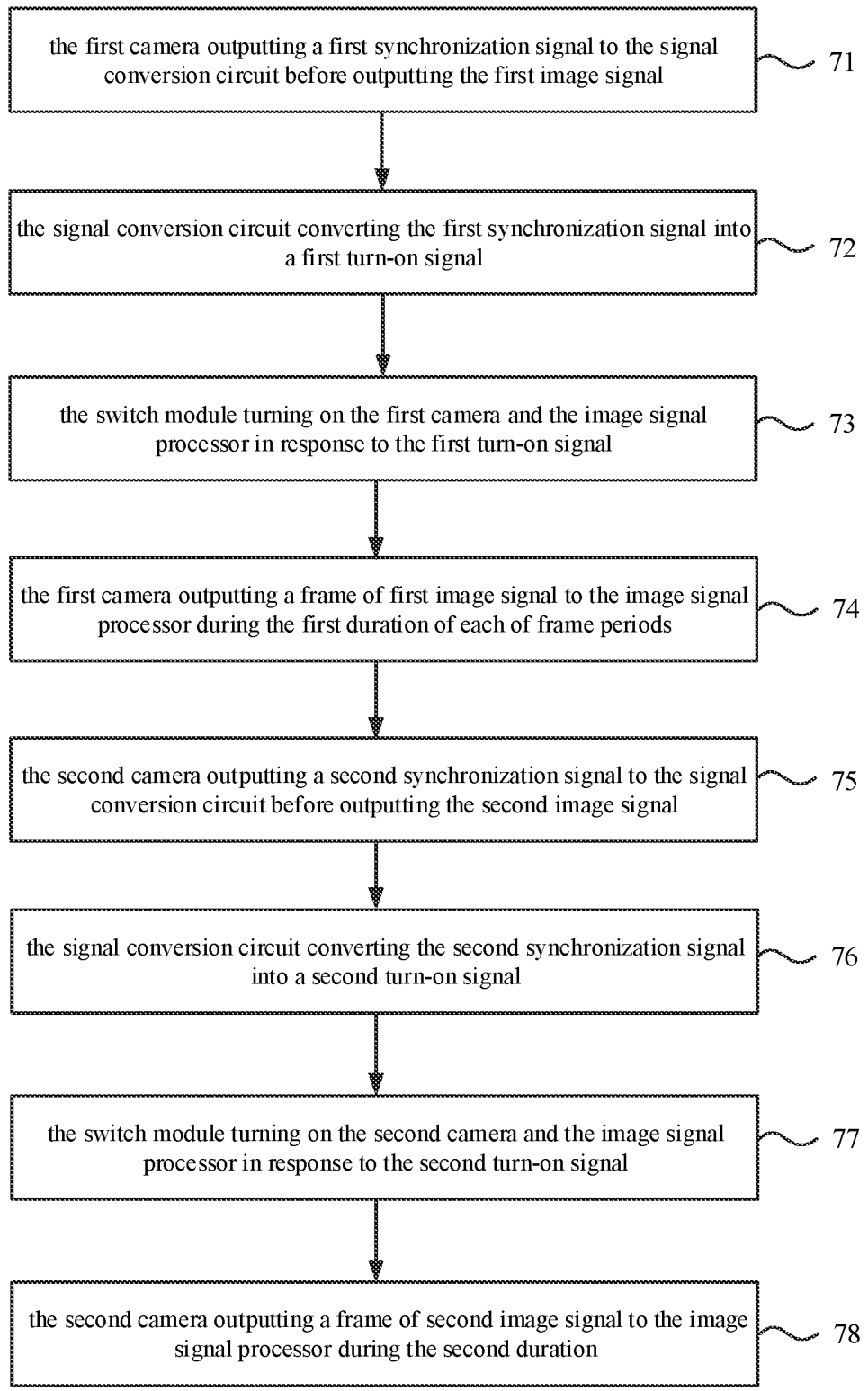
FIG. 7 is a flow chart of an image display method, according to exemplary embodiments of the disclosure.

FIG. 7 is a flow chart of an image display method, according to exemplary embodiments of the disclosure. In some embodiments, the image display apparatus may further include a signal conversion circuit. The signal conversion circuit is coupled to the first camera and the switch module. With reference to FIG. 7, the method may include the following.

At block 71, the first camera outputs a first synchronization signal to the signal conversion circuit before outputting the first image signal.

Exemplarily, the first synchronization signal is generated by the first camera, and the first camera usually outputs the hw sync A signal to the signal conversion circuit before the header of the frame of first image signal is outputted.

At block 72, the signal conversion circuit converts the first synchronization signal into a first turn-on signal.

At block 73, the switch module turns on the first camera and the image signal processor in response to the first turn-on signal.

At block 74, the first camera outputs a frame of first image signal to the image signal processor during each of frame periods. Each of the frame periods may include a first duration and a second duration. The first duration is configured for indicating a duration for outputting the first image signal by the first camera. The second duration is configured for indicating a duration for terminating outputting the first image signal by the first camera.

In some embodiments of the disclosure, the signal conversion circuit may also be coupled to the second camera.

At block 75, the second camera outputs a second synchronization signal to the signal conversion circuit before outputting the second image signal.

Exemplarily, the second synchronization signal is generated by the second camera, and the second camera usually outputs the hw sync B signal to the signal conversion circuit before the header of the frame of second image signal is outputted.

At block 76, the signal conversion circuit converts the second synchronization signal into a second turn-on signal.

At block 77, the switch module turns on the second camera and the image signal processor in response to the second turn-on signal.

At block 78, the second camera outputs a frame of second image signal to the image signal processor during the second duration.

The disclosure does not limit the sequence of the action at block 71 and the action at block 75 and the above is only an example.

With the image display method provided in embodiments of the disclosure, the first synchronization signal is output to the signal conversion circuit through the first camera, and the first synchronization signal is converted into the first turn-on signal through the signal conversion circuit. The switch module responds to the first turn-on signal and turns on the first camera and the image signal processor, so that the first camera outputs the first image signal to the image signal processor during the first duration of each frame period. The second synchronization signal is outputted to the signal conversion circuit through the second camera, and the second synchronization signal is converted into the second turn-on signal through the signal conversion circuit. The switch module turns on the second camera and the image signal processor in response to the second turn-on signal, so that the second camera outputs the second image signal to the image signal processor during the second duration of each frame period. In this way, during each frame period, the first camera and the second camera may both output image signals to the image signal processor, which makes the first camera and the second camera share one image signal processor and work at the same time. Therefore, it is beneficial to improve the user experience Some embodiments of the disclosure also provide an electronic device, including any of the above-mentioned image display apparatuses.

Figure 8:
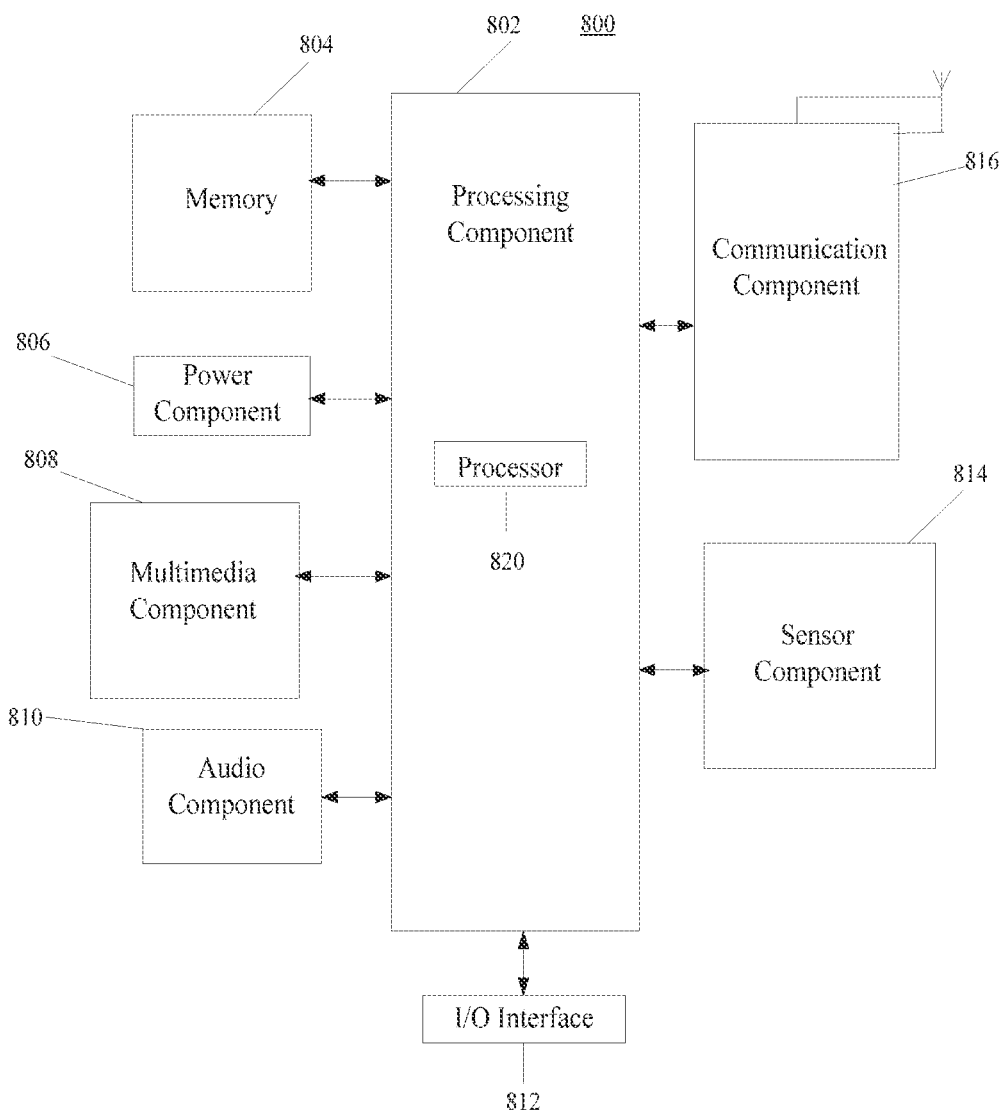
FIG. 8 is a block diagram of an electronic device, according to an exemplary embodiment of the disclosure.

FIG. 8 is a block diagram of an electronic device, according to an exemplary embodiment of the disclosure. For example, the device 800 may be a user device, such as a mobile phone, a computer, a digital broadcast terminal, a messaging device, a gaming console, a tablet, a medical device, exercise equipment, a personal digital assistant, a wearable device such as a smart watch, smart glasses, a smart bracelet, smart running shoes, and the like.

Referring to FIG. 8, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided an electronic device. The electronic device may include a processor; and a memory for storing instructions executable by the processor. The processor is configured to execute the instructions to perform any of the image display methods mentioned above.

In exemplary embodiments, there is also provided a non-transitory computer-readable storage medium including instructions, such as included in the memory 804, executable by the processor 820 in the device 800, for performing the above-described methods. For example, the non-transitory computer-readable storage medium may be a ROM, a RAM, a CD-ROM, a magnetic tape, a floppy disc, an optical data storage device, and the like.

As for the method embodiments, since they basically correspond to the apparatus embodiments, the relevant part may refer to the description of the apparatus embodiments. The method embodiments and the apparatus embodiments are complementary to each other.

The above-mentioned various embodiments of the disclosure may be complementary to each other without conflict.

The above are only the preferred embodiments of the disclosure and are not intended to limit the disclosure. Any modification, equivalent replacement, improvement, and the like made within the spirit and principle of the disclosure shall be included with the scope of protection of the disclosure.

What is claimed is:

1. An image display apparatus, comprising:
   a first camera, configured to output a frame of first image signal during each of frame periods, each of the frame periods comprising a first duration and a second duration, the first duration for indicating a duration for outputting the first image signal by the first camera, and the second duration for indicating a duration for terminating outputting the first image signal by the first camera;
   a second camera, configured to output a frame of second image signal during the second duration;
   an image signal processor;
   a switch module, coupled to the first camera, the second camera, and the image signal processor, and configured to turn on the first camera and the image signal processor before the first image signal is outputted, and to turn on the second camera and the image signal processor before the second image signal is outputted; and
   a signal conversion circuit, coupled to the first camera and the switch module;
   wherein the first camera is further configured to output a first synchronization signal to the signal conversion circuit before outputting the first image signal, and the signal conversion circuit is configured to convert the first synchronization signal into a first turn-on signal.

2. The apparatus of claim 1, wherein the signal conversion circuit is further coupled to the second camera;
   the second camera is further configured to output a second synchronization signal to the signal conversion circuit before outputting the second image signal, and
   the signal conversion circuit is configured to convert the second synchronization signal into a second turn-on signal.

3. The apparatus of claim 2, wherein the switch module is configured to:
   turn on the first camera and the image signal processor in response to the first turn-on signal; and
   turn on the second camera and the image signal processor in response to the second turn-on signal.

4. The apparatus of claim 1, wherein,
   the first camera comprises a first mobile industry processor interface Mipi, the first Mipi is coupled to the switch module through a first Mipi bus; and/or
   the second camera comprises a second Mipi, the second Mipi is coupled to the switch module through a second Mipi bus; and/or
   the switch module comprises a third Mipi, the third Mipi is coupled to the image signal processor through a third Mipi bus.

5. The apparatus of claim 1, wherein,
   a duration for outputting the frame of second image signal by the second camera is equal to the first duration; and/or,
   a duration for outputting the frame of second image signal by the second camera is less than the second duration.

6. An image display method for an image display apparatus, the image display apparatus comprising a first camera, a second camera, a switch module coupled to the first camera and the second camera, and an image signal processor coupled to the switch module; the method comprising:
   turning on, by the switch module, the first camera and the image signal processor;
   outputting, by the first camera, a frame of first image signal to the image signal processor during each of frame periods, each of the frame periods comprising a first duration and a second duration, the first duration for indicating a duration for outputting the first image signal by the first camera, and the second duration for indicating a duration for terminating outputting the first image signal by the first camera;
   turning on, by the switch module, the second camera and the image signal processor; and
   outputting, by the second camera, a frame of second image signal to the image signal processor during the second duration;
   wherein the image display apparatus further comprises a signal conversion circuit coupled to the first camera and the switch module; and
   the method further comprises:
   outputting, by the first camera, a first synchronization signal to the signal conversion circuit before outputting the first image signal; and
   converting, by the signal conversion circuit, the first synchronization signal into a first turn-on signal.

7. The method of claim 6, wherein the signal conversion circuit is further coupled to the second camera;
   the method further comprises:
   outputting, by the second camera, a second synchronization signal to the signal conversion circuit before outputting the second image signal; and
   converting, by the signal conversion circuit, the second synchronization signal into a second turn-on signal.

8. The method of claim 7, wherein,
   turning on, by the switch module, the first camera and the image signal processor, comprises:
   turning on, by the switch module, the first camera and the image signal processor in response to the first turn-on signal;
   turning on, by the switch module, the second camera and the image signal processor, comprises:
   turning on, by the switch module, the second camera and the image signal processor in response to the second turn-on signal.

9. An electronic device, comprising an image display apparatus, wherein the image display apparatus comprises:
   a first camera, configured to output a frame of first image signal during each of frame periods, each of the frame periods comprising a first duration and a second duration, the first duration for indicating a duration for outputting the first image signal by the first camera, and the second duration for indicating a duration for terminating outputting the first image signal by the first camera;

a second camera, configured to output a frame of second image signal during the second duration;

an image signal processor; and a switch module, coupled to the first camera, the second camera, and the image signal processor, and configured to turn on the first camera and the image signal processor before the first image signal is outputted, and turn on the second camera and the image signal processor before the second image signal is outputted, wherein the apparatus further comprises:

a signal conversion circuit, coupled to the first camera and the switch module;

wherein the first camera is further configured to output a first synchronization signal to the signal conversion circuit before outputting the first image signal, and the signal conversion circuit is configured to convert the first synchronization signal into a first turn-on signal.

10. The device of claim 9, wherein the signal conversion circuit is further coupled to the second camera;

the second camera is further configured to output a second synchronization signal to the signal conversion circuit before outputting the second image signal, and the signal conversion circuit is configured to convert the second synchronization signal into a second turn-on signal.

11. The device of claim 10, wherein the switch module is configured to:

turn on the first camera and the image signal processor in response to the first turn-on signal; and turn on the second camera and the image signal processor in response to the second turn-on signal.

12. The device of claim 9, wherein, the first camera comprises a first mobile industry processor interface Mipi, the first Mipi is coupled to the switch module through a first Mipi bus; and/or the second camera comprises a second Mipi, the second Mipi is coupled to the switch module through a second Mipi bus; and/or the switch module comprises a third Mipi, the third Mipi is coupled to the image signal processor through a third Mipi bus.

13. The device of claim 9, wherein, a duration for outputting the frame of second image signal by the second camera is equal to the first duration; and/or, a duration for outputting the frame of second image signal by the second camera is less than the second duration.

* * * * *